US 11,277,752 B2

(12) United States Patent
Zhao et al.

(10) Patent No.: US 11,277,752 B2
(45) Date of Patent: *Mar. 15, 2022

(54) ELECTRONIC DEVICE AND METHOD FOR THE ELECTRONIC DEVICE FOR CLUSTERING OF HIGH PRIORITY LEVEL SECONDARY SYSTEMS

(71) Applicant: Sony Corporation, Tokyo (JP)

(72) Inventors: Youping Zhao, Beijing (CN); Wei Ding, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 16/919,352

(22) Filed: Jul. 2, 2020

(65) Prior Publication Data

US 2020/0344612 A1 Oct. 29, 2020

Related U.S. Application Data

(63) Continuation of application No. 16/311,180, filed as application No. PCT/CN2017/091932 on Jul. 6, 2017, now Pat. No. 10,757,578.

(30) Foreign Application Priority Data

Jul. 29, 2016 (CN) .......................... 201610616418.4

(51) Int. Cl.
H04W 16/14 (2009.01)
H04W 72/04 (2009.01)
(Continued)

(52) U.S. Cl.
CPC ....... *H04W 16/14* (2013.01); *H04W 72/0453* (2013.01); *H04W 72/082* (2013.01); *H04W 72/10* (2013.01)

(58) Field of Classification Search
CPC ............ H04W 16/14; H04W 72/0453; H04W 72/082; H04W 72/10
See application file for complete search history.

(56) References Cited

U.S. PATENT DOCUMENTS 9,326,152 B1 * 4/2016 Yiu ....................... H04L 5/0073
2010/0304680 A1 12/2010 Kuffner et al.
(Continued)

FOREIGN PATENT DOCUMENTS

CN 102595419 A 7/2012
CN 104144432 A 11/2014
(Continued)

OTHER PUBLICATIONS

Office Action dated Nov. 19, 2020, in corresponding European patent Application No. 17833408.2, 6 pages.
(Continued)

Primary Examiner — Jinsong Hu
Assistant Examiner — Nicole M Louis-Fils
(74) Attorney, Agent, or Firm — Xsensus, LLP

(57) ABSTRACT

Provided are an electronic device and a method for an electronic device. The electronic device comprises a processing circuit, configured to: determine a first set of a high priority secondary system based on mutual interference between a low-priority sub-system and the high-priority sub-system, wherein the mutual interference between the high-priority sub-system in the first set and at least one low-priority sub-system is higher than a pre-set level; and based on information related to the first set, clustering the high-priority sub-system in the first set.

20 Claims, 9 Drawing Sheets

(51) Int. Cl.
*H04W 72/08* (2009.01)
*H04W 72/10* (2009.01)

(56) References Cited

U.S. PATENT DOCUMENTS

| | | |
|---|---|---|
| 2010/0322159 A1 | 12/2010 | Ko et al. |
| 2012/0083303 A1 | 4/2012 | Min et al. |
| 2012/0157144 A1* | 6/2012 | Stanforth .............. H04W 16/14 |
| | | 455/512 |
| 2015/0003549 A1 | 1/2015 | Kim et al. |
| 2015/0103778 A1 | 4/2015 | Kim et al. |
| 2015/0296404 A1* | 10/2015 | Sharma .................. H04W 4/70 |
| | | 370/230 |
| 2015/0373554 A1 | 12/2015 | Freda et al. |
| 2016/0006522 A1 | 1/2016 | Furuichi et al. |
| 2016/0338030 A1* | 11/2016 | Shnaiwer .............. H04W 16/14 |
| 2017/0041801 A1* | 2/2017 | Liu ........................ H04W 16/10 |
| 2017/0150365 A1 | 5/2017 | Goswami et al. |
| 2017/0188363 A1* | 6/2017 | Ellinikos ........... H04W 72/0453 |

FOREIGN PATENT DOCUMENTS

| | | |
|---|---|---|
| CN | 105578474 A | 5/2016 |
| EP | 3220682 A1 | 9/2017 |
| WO | 2015/158124 A1 | 10/2015 |
| WO | 2015/169060 A1 | 11/2015 |
| WO | 2016/074643 A1 | 5/2016 |

OTHER PUBLICATIONS

English language translation of International Search Report for PCT/CN2017/091932, dated Sep. 30, 2017.

* cited by examiner

ELECTRONIC DEVICE AND METHOD FOR THE ELECTRONIC DEVICE FOR CLUSTERING OF HIGH PRIORITY LEVEL SECONDARY SYSTEMS

CROSS-REFERENCE TO RELATED APPLICATIONS

The present application is a continuation of U.S. application Ser. No. 16/311,180, filed Dec. 19, 2018, which is based on PCT filing PCT/CN2017/091932, filed Jul. 6, 2017, which claims priority to CN 201610616418.4, filed Jul. 29, 2016, each of which is incorporated herein by reference in its entirety.

FIELD OF THE INVENTION

Embodiments of the present disclosure generally relate to the field of wireless communications, in particular to spectrum resource management in a wireless communication system using the cognitive radio technology, and more particular to an electronic apparatus and a method for the electronic apparatus.

BACKGROUND OF THE INVENTION

With the development of wireless communication technology, demands of a user for high quality, a high speed, a new service is higher and higher. A wireless communication operator and a device manufacturer should continuously improve a system to meet the demands of the user. In this case, a large amount of spectrum resources are required to support the new service arising continuously, and to meet requirements of high-speed communications, and the spectrum resources may be quantized with a parameter such as time, frequency, band width, allowable maximum emitting power.

Currently, limited spectrum resources have been allocated to fixed operators and services, new available spectrum is very rare or expensive. Yet, a large number of actual measurement results indicate that generally the utilization rate of the allocated licensed spectrum is not high. In this case, a concept of dynamic spectrum usage is proposed, that is, spectrum resources which have been allocated to certain services but are not utilized sufficiently are utilized dynamically.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an electronic apparatus is provided, which includes processing circuitry configured to: determine, based on mutual interferences between low priority level secondary systems and high priority level secondary systems, a first set of the high priority level secondary systems, where the mutual interferences between the high priority level secondary systems in the first set and at least one low priority level secondary system are higher than a predetermined level; and cluster, based on information related to the first set, the high priority level secondary systems in the first set.

According to another aspect of the present disclosure, a method for an electronic apparatus is provided, which includes: determining, based on mutual interferences between low priority level secondary systems and high priority level secondary systems, a first set of the high priority level secondary systems, where the mutual interferences between the high priority level secondary systems in the first set and at least one low priority level secondary system are higher than a predetermined level; and clustering, based on information related to the first set, the high priority level secondary systems in the first set.

According to other aspects of the present disclosure, there are further provided computer program codes and computer program products for methods for the electronic apparatus as well as a computer-readable storage medium recording the computer program codes for implementing the methods.

With the electronic apparatus and the method according to embodiments of the present disclosure, the high priority level secondary systems are clustered in a case of considering the low priority level secondary systems, such that available spectrum resources for the low priority level secondary systems are increased while ensuring the quality of service of the high priority level secondary system.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

Figure 1:
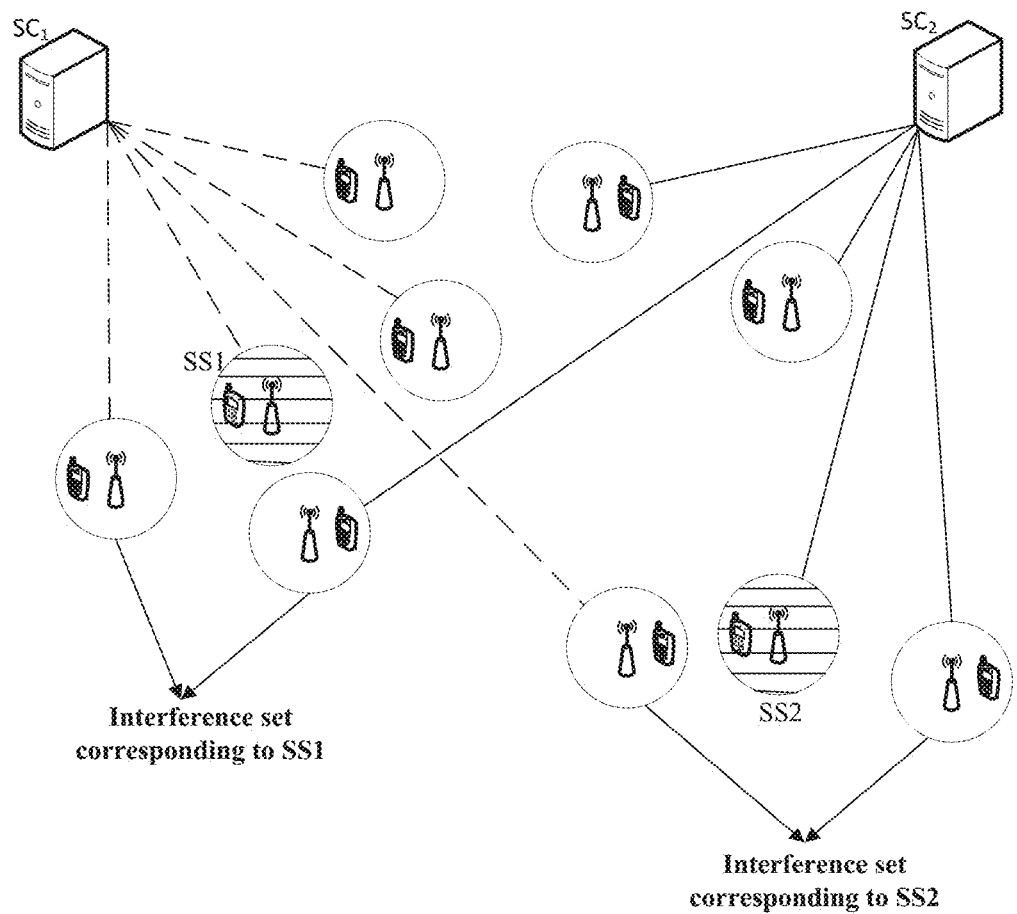
FIG. 1 shows a schematic diagram of a scenario of a cognitive radio system.

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

Cognitive Radio System

The cognitive radio (CR) technology is intelligent evolution of the software radio technology. With the CR technology, an unlicensed user can dynamically access to licensed spectrum according to a certain rule, thereby greatly improving an actual spectrum utilization rate. Multiple transceiving mechanisms with a cognitive function form a cognitive radio system (CRS), which is also referred to as a dynamic spectrum access (DAS) system. It can be regarded that the cognitive radio system includes a primary system and a secondary system. The primary system refers to a system which is licensed to use the spectrum, and the secondary system refers to an unlicensed communication system which dynamically accesses to the licensed spectrum according to a certain rule. In addition, a functional module called spectrum coordinator (SC) is provided to manage the secondary systems and allocate resources for the secondary systems. Further, a public spectrum coordinator (P-SC) may be further provided to manage multiple spectrum coordinators.

Alternatively, the secondary system may also be a system with the right of using the spectrum, but have a lower priority level than the primary system in using the spectrum. For example, when an operator deploys a new base station to provide a new service, the existing base stations and the provided services function as the primary system and have a priority in using the spectrum.

As an application example, the cognitive radio system includes a broadcast and television system and a wifi communication system. Specifically, the broadcast and television spectrum itself is allocated to the broadcast and television system, therefore, the broadcast and television system is a primary system, and may include a primary user base station (for example, a television tower) and multiple primary users (for example, televisions). The wifi communication system is a secondary system, and may each include a secondary user base station (for example, a wifi access point) and a secondary user (for example, a portable computer). In the cognitive radio system, spectrum of a channel, on which no program is played or spectrum of an adjacent channel on the digital broadcast and television spectrum can be utilized dynamically to perform wifi communication, without interfering with the television signal reception.

Specifically, a UHF frequency band is allocated to the broadcast and television service, and therefore, the broadcast and television system has the highest priority level in the UHF frequency band, and is a primary system. In addition, spectrum resources in the UHF frequency band, which are not used by the broadcast and television system during a certain time period or within a certain area, can be allocated to the other communication system such as the wifi communication system described above or a mobile communication system.

In the communication manner in which the primary system and the secondary system coexist, it is required that an application of the secondary system does not have an adverse effect on an application of the primary system, alternatively, an influence of spectrum usage of the secondary system can be controlled to be within an allowable range of the primary system. In the case that the interferences on the primary system are ensured to be within a certain range, that is, does not exceed an interference threshold of the primary system, resources of the primary system usable by the secondary systems can be allocated to multiple secondary systems.

It should be understood by those skilled in the art that a case that the primary system is the broadcast and television system is described above, however, the present disclosure is not limited thereto. The primary system may be the another communication system having a legal usage right of spectrum, for example, a mobile communication system, and the secondary system may also be the another system which needs to use the spectrum resources to perform communication, for example, an intelligent meter reading system.

In the embodiment of the present disclosure, the secondary system is a wireless communication system, which may be understood as a combination of multiple devices having transmitting and receiving functions. For example, the wireless communication system may be a set of all base stations and user equipment belonging to the same mobile operator, or a set of all base stations and user equipment using the same communication scheme for the same mobile operator. The wireless communication system may also be a subset of the above set, for example, including base stations and user equipment in a management area of a spectrum coordinator. In addition, the wireless communication system may be a set of base stations and user equipment belonging to different mobile operators but using the same communication scheme, or a subset thereof similar to the subset described above. In another aspect, the wireless communication system may also be a set of base stations and user equipment belonging to the same service provider, or a subset thereof similar to the subset described above. As an example, in a case of an LTE communication system, the wireless communication system may be a subset of the LTE communication system, for example a set of subsystems on a cell level. The subsystem on the cell level may, for example, include a base station (a macro base station or a small base station) and one or more of user equipment. Of course, the wireless communication system is not limited to the LTE communication system or its subset, and may be a communication system of other types or its subset, for example a wifi communication system or its subset, etc. In addition, in some examples, for example in a device to device communication scenario, the wireless communication system may be understood as a device cluster formed by multiple user equipment.

In addition, different secondary systems may have different priority levels in dynamically using the spectrum resources. The high priority level secondary system has a priority in using the spectrum resources relative to the low priority level secondary system. For example, for the WiFi communication system, a secondary system used by a school or a hospital may function as a high priority level secondary system, and another secondary system may function as the low priority level secondary system. For example, resources allocation is generally performed only for the high priority level secondary systems without considering the low priority level secondary systems, which may result in that there are few available spectrum resources for the low priority level secondary systems. In a case that the technology of the present disclosure is applied to the high priority level secondary systems and the low priority level secondary systems, the secondary systems as a whole may access to idle licensed spectrum (that is, the spectrum is not occupied by the primary system currently), thereby avoiding generating interferences to the primary system by the secondary systems.

FIG. 1 shows a schematic diagram of a scenario of a cognitive radio system. For conciseness, the secondary system is indicated as a transceiver pair in FIG. 1. However, it should be understood that FIG. 1 shows only an example, and the secondary system may be any wireless communication system described above.

In the scenario shown in FIG. 1, there are two spectrum coordinators SC1 and SC2, and management areas of SC1 and SC2 overlap. Secondary systems connected by solid lines are managed by SC2, and secondary systems connected by dotted lines are managed by SC1. Secondary systems SS1 and SS2 filled with horizontal lines are low priority level secondary systems, and the remaining secondary systems are high priority level secondary systems. It should be understood that, FIG. 1 shows only an example for illustration, and the scenario to which the technology of the present disclosure may be applied is not limited to that shown in FIG. 1. For example, the number of spectrum coordinators may be one or more, and the secondary systems may be distributed in other forms.

First Embodiment

Figure 2:
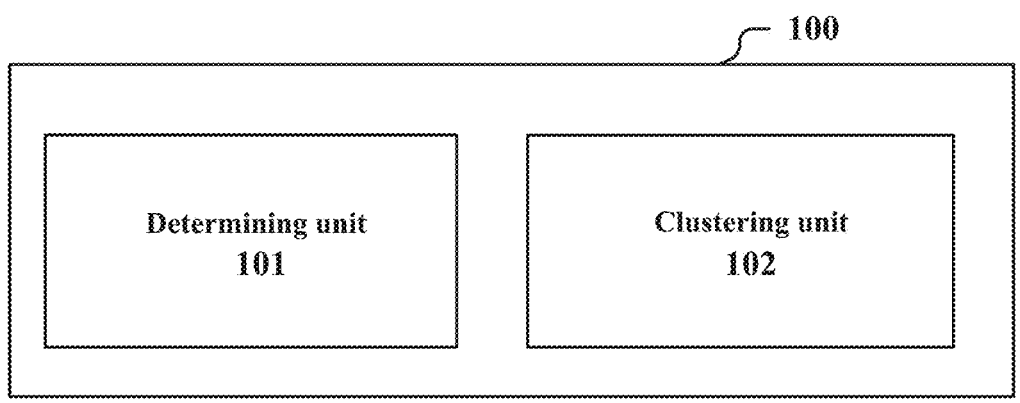
FIG. 2 shows a block diagram of functional modules of an electronic apparatus according to an embodiment of the present disclosure.

FIG. 2 shows a block diagram of functional modules of an electronic apparatus 100 according to an embodiment of the present disclosure. The electronic apparatus 100 includes: a determining unit 101, configured to determine, based on mutual interferences between low priority level secondary systems and high priority level secondary systems, a first set of the high priority level secondary systems, wherein the mutual interferences between the high priority level secondary system in the first set and at least one low priority level secondary system are higher than a predetermined level; and a clustering unit 102, configured to cluster the high priority level secondary systems in the first set based on information related to the first set.

The determining unit 101 and the clustering unit 102 may, for example, be implemented by one or more processing circuits. The processing circuits may be implemented as a chip, for example.

The determining unit 101 determines the following high priority level secondary systems as a first set: mutual interferences between the high priority level secondary systems in the first set and low priority level secondary systems are so high that a quality of service requirement cannot be met. The clustering unit 102 clusters the high priority level secondary systems in the first set, so as to minimize the number of clusters into which the high priority level secondary systems in the first set are clustered while ensuring the quality of service of the secondary systems. In this way, the low priority level secondary systems may have more available spectrum resources. In the present disclosure, the clustering means grouping the secondary systems, such that mutual interferences between the secondary systems in the same group when they perform communication simultaneously by using the same spectrum resources are small, for example, capable of meeting quality of service requirements of respective secondary systems. In addition, different clusters use different spectrum resources. In this way, the utilization efficiency of spectrum resources can be improved, and the quality of service requirements of respective secondary systems can be met simultaneously.

In an example, the determining unit 101 is configured to determine the first set by determining an interference set of each low priority level secondary system and combining the interference sets. The interference set includes a high priority level secondary system which generates interferences higher than a first predetermined level to the low priority level secondary system and a high priority level secondary system which is subjected to interferences higher than a second predetermined level from the low priority level secondary system.

For example, in a case that locations of the low priority level secondary systems are fixed, it may be determined by the following formula (1) whether interferences produced by a low priority level secondary system m to a high priority level secondary system n exceed the first predetermined level. Similarly, it may be determined by the following formula (2) whether interferences produced by the high priority level secondary system n to the low priority level secondary system m exceed the second predetermined level. Here, the predetermined level of interferences is represented by a predetermined signal to interference and noise ratio (SINR). The SINR also represents quality of service required by the secondary system.

$$\frac{P_n^H (d_{nn}^{HH})^{-\alpha}}{P_m^L (d_{mn}^{LH})^{-\alpha} + \sigma^2} < SINR_{th(n)}^H \qquad (1)$$

$$\frac{P_m^L (d_{mm}^{LL})^{-\alpha}}{P_n^H (d_{nm}^{HL})^{-\alpha} + \sigma^2} < SINR_{th(m)}^L \qquad (2)$$

In which, $P_n^H$ represents an emission power of the high priority level secondary system n, $P_m^L$ represents an emission power of the low priority level secondary system m, $d_{mn}^{LH}$ represents a distance between a transmitter of the low priority level secondary system m and a receiver of the high priority level secondary system n, $d_{nm}^{HL}$ represents a distance between a transmitter of the high priority level secondary system n and a receiver of the low priority level secondary system m, $d_{nn}^{HH}$ represents a distance between the transmitter and the receiver of the high priority level secondary system n, $d_{mm}^{LL}$ represents a distance between the transmitter and the receiver of the low priority level secondary system m, a represents a path loss index, $\sigma^2$ represents a noise power, $SINR_{th(n)}^{H}$ and $SINR_{th(m)}^{L}$ respectively represent SINR thresholds which the receiver of the high priority level secondary system n and the low priority level secondary system m should achieve. It may be seen that, in a case that the formula (1) is met, the interferences to the high priority level secondary system n from the low priority level secondary system m would exceed the first predetermined level; and/or in a case that the formula (2) is met, the interferences to the low priority level secondary system m from the high priority level secondary system n would exceed the second predetermined level, and thus it is possible to add the high priority level secondary system n into the interference set of the low priority level secondary system m. After obtaining the interference set of each low priority level secondary system, the determining unit 101 combines the interference sets to obtain the first set.

Figure 3:
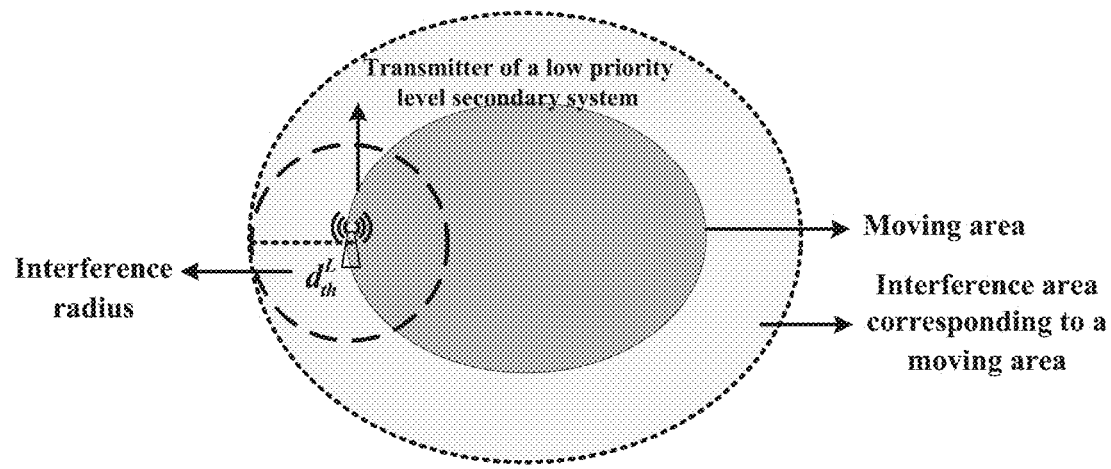
FIG. 3 shows a schematic diagram of determining an interference area.

In another aspect, in a case that the low priority level secondary system moves within a certain area, if the interference set is updated and the clustering is performed in real time based on a location change of the low priority level secondary system, signaling overhead of the system would be too high. Therefore, alternatively, an interference area corresponding to the moving area can be determined, as shown in FIG. 3. In this case, the determining unit 101 is configured to determine an interference radius for a mobile secondary system, so as to determine its interference area based on its moving area, thereby determining the interference set.

The interference radius may be obtained by setting the operator in the formula (1) to be an equal sign and performing transformation to calculate $d_{mn}^{LH}$. Such calculated $d_{mn}^{LH}$ is the interference radius $d_{th}^{L}$, as shown in the following formula (3). It may be seen that, for different emission powers, the high priority level secondary system has different interference radii.

$$d_{th}^L = \left( \frac{P_m^L SINR_{th(n)}^H}{P_n^H (d_{mn}^{HH})^{-\alpha} - \sigma^2 SINR_{th(n)}^H} \right)^{\frac{1}{\alpha}} \quad (3)$$

As shown in FIG. 3, for each point in a boundary of the moving area, an area finally obtained through extending outward by a length of the interference radius from the point along a vertical line direction, is the interference area. The high priority level secondary systems located in the interference area may be added into the interference set.

In addition, in a case that the high priority level secondary system moves in a certain area, an interference radius of the high priority level secondary system can be obtained by using the similar method based on the following formula (4), and further its interference area can be obtained. In formula (4), the interference radius $d_{th}^{H}$ is obtained by setting the operator in the formula (2) to be an equal sign and performing transformation. In a case that there is a low priority level secondary system in the interference area, the high priority level secondary system may be added into the interference set of corresponding low priority level secondary system.

$$d_{th}^H = \left( \frac{P_n^H SINR_{th(m)}^L}{P_m^L (d_{mn}^{LL})^{-\alpha} - \sigma^2 SINR_{th(m)}^L} \right)^{\frac{1}{\alpha}} \quad (4)$$

As an example, the determining unit 101 may determine the moving area with reference to historical information or a geographical location database.

After the determining unit 101 determines an interference set of each low priority level secondary system and combines the interference sets to obtain the first set, the clustering unit 102 clusters the high priority level secondary systems in the first set. It should be understood that, the high priority level secondary systems may be managed by one or more spectrum coordinators.

Exemplarily, the clustering unit 102 may be configured to cluster the high priority level secondary systems in the first set as follows: selecting a high priority level secondary system which is subjected to the maximum accumulated interferences from other high priority level secondary systems that are not clustered in the first set, as a first member of a cluster; selecting, when adding a new member, a high priority level secondary system which is subjected to maximum accumulated interferences from existing members in the cluster, from the high priority level secondary systems that are not clustered in the first set, so that the mutual interferences among respective members in the cluster after adding do not exceed an allowable value. With such a clustering manner, geographical locations of members in each cluster are relatively centralized, thereby being beneficial to reduce the number of clusters. In addition, the clustering manner is not limited to clustering of the high priority level secondary systems in the first set, and may be applied to clustering of various other secondary systems, including but not limited to clustering of high priority level secondary systems outside of the first set, clustering of all high priority level secondary systems and so on.

Whether mutual interferences among respective members in the cluster exceed the allowable value is evaluated by determining whether quality of service of each member in the cluster can meet its quality of service requirement, for example. Exemplarily, it can be required that the SINR of each member in the cluster reaches or exceeds an SINR threshold, or a difference between the SINR of each member and the SINR threshold exceeds a preset value. The preset value may be set based on the number of the secondary systems and the number of available resources, for example.

The clustering unit 102 is further configured to create a new cluster if there is a high priority level secondary system which cannot be added to existing clusters, in a case that the number of the existing clusters does not reach the number of available channels. In a case that one high priority level secondary system is added into the existing cluster, there is a secondary system of which a quality of service requirement for example the SINR threshold cannot be met, it is indicated that the high priority level secondary system cannot be added into the existing cluster. In another aspect, if the number of the existing clusters reaches the number of available channels, the clustering is stopped and a current clustering result is output. The unclustered high priority level secondary system does not participate in spectrum allocation, that is, cannot obtain the spectrum usage right.

In addition, although in the above example, when adding a new member into the cluster, a high priority level secondary system which is subjected to maximum accumulated interferences from existing members in the cluster is selected, a high priority level secondary system which is subjected to minimum accumulated interferences from existing members in the cluster may also be selected.

In an example, the clustering unit 102 may determine an interference relationship between high priority level secondary systems by establishing a directed weighted graph. The directed weighted graph may be established based on a location and an emission power of the high priority level secondary system, for example. The directed weighted graph may be represented as G=(V, E, W). In which, V represents a set formed by the high priority level secondary systems, E represents a set of directed edges between the secondary systems, and W represents a set of weights $w_{ij}$ of all directed edges. $w_{ij}$ represents relative interferences which a secondary system i is subjected to from a secondary system j and is indicated by the following formula (5). $w_i$ represents accumulated relative interferences which the secondary system i is subjected to and is indicated by the following formula (6).

$$w_{ij} = \frac{P_j(d_{ji})^{-\alpha}}{P_i(d_{ii})^{-\alpha}} \quad (5)$$

$$w_i = \sum_{j \in C_s} w_{ij} \quad (6)$$

In which, $P_j$ and $P_i$ respectively represent emission powers of a secondary system j and a secondary system i, $d_{ji}$ represents a distance between the transmitter of the secondary system j and the receiver of the secondary system i, $d_{ii}$ represents a distance between the transmitter and the receiver of the secondary system i, and $C_s$ represents a set of secondary systems belonging to a cluster s. By comparing the value of $w_i$, the high priority level secondary system which is subjected to the maximum accumulated interferences from the existing members in the cluster may be selected, for example.

Figure 4:
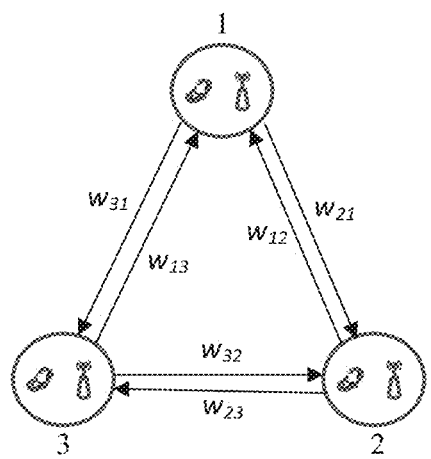
FIG. 4 shows an example of a directed weighted graph established by taking three secondary systems as an example.

For ease of understanding, FIG. 4 shows an example of a directed weighted graph established by taking three high priority level secondary systems as an example. Three secondary systems serve as vertices and are indicated by numbers 1, 2 and 3 respectively. A directed edge connects two vertices, $w_{ij}$ marked on the directed edge indicates a weight, and subscripts of $w_{ij}$ indicate numbers of the two vertices of the directed edge. For example, in a case that the secondary system 1 is included in a cluster 1 and a new member is to be added into the cluster 1, interferences that the secondary systems 2 and 3 are subjected to from the secondary system 1 are compared, that is, comparing $w_{21}$ with $w_{31}$. The secondary system corresponding to the greater one of $w_{21}$ and $w_{31}$ is selected to be added into the cluster 1, and it is determined whether the SINR of each secondary system in the cluster 1 at this time reaches its threshold. If the SINR can reach its threshold, it is indicated that the secondary system may be added into the cluster 1. In a case that there are more secondary systems, similar comparing and adding are performed.

For high priority level secondary systems outside of the first set, the clustering may be performed by using the same manner as that described above, or may be performed by using other manners. Further, the clustering may be performed independently or based on a clustering result for the first set, which are not limited.

As an example, the determining unit 101 may be further configured to take high priority level secondary systems outside of the first set as a second set, where mutual interferences between the high priority level secondary systems in the second set and each low priority level secondary system are lower than a predetermined level. The clustering unit 102 clusters the high priority level secondary systems based on information related to the first set and the second set.

For example, the clustering unit 102 may be configured to perform clustering to minimize the number of finally obtained clusters. In this way, the number of the available spectrum resources for the low priority level secondary systems can be maximized.

In an example, the clustering unit 102 is configured to first cluster the high priority level secondary systems in the first set and then cluster the high priority level secondary systems in the second set based on a result of the clustering. For example, the clustering unit 102 adds the high priority level secondary systems in the second set into the existing clusters obtained by clustering the high priority level secondary systems in the first set when clustering the high priority level secondary systems in the second set, and creates a new cluster in a case that the high priority level secondary system cannot be added into the existing clusters and the number of the existing clusters does not reach the number of available channels.

Figure 5:
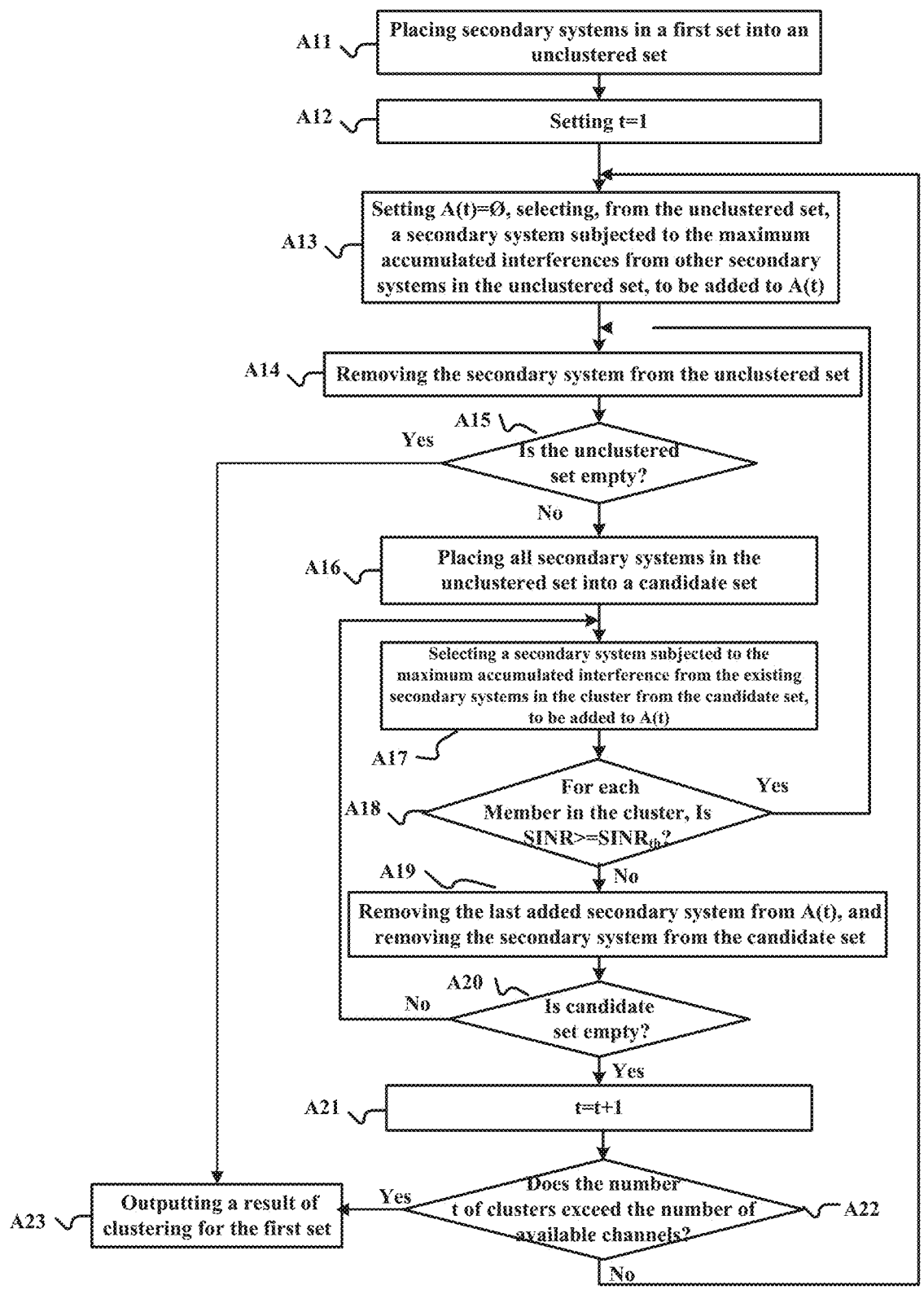
FIG. 5 shows a specific example of a flowchart of clustering high priority level secondary systems in a first set.

For ease of understanding, FIG. 5 shows a specific example of a flowchart of the clustering operation for the first set in this example. It should be understood that, FIG. 5 is only illustrative rather than restrictive, and operations performed by the clustering unit 102 are not limited to those shown in FIG. 5.

For example, in step A11, the high priority level secondary systems in the first set are placed in an unclustered set. In step A12, an initial value of a number t of the cluster is set to 1. In step A13, the cluster A(t) is initialized into an empty set, and a secondary system among the unclustered set which is subjected to the maximum accumulated interferences from other secondary systems in the unclustered set is selected to be added into the cluster A(t). Subsequently, in step A14, the secondary system added into the cluster A(t) is removed from the unclustered set. In step A15, it is determined whether the unclustered set is empty; if the unclustered set is empty, it is indicated that the clustering ends, the processing proceeds to step A23, and a clustering result for the first set is output; otherwise, the processing proceeds to step A16, and all high priority level secondary systems in the unclustered set are added into a candidate set. In step A17, a secondary system which is subjected to the maximum accumulated interferences from the existing secondary systems in the cluster is selected from the candidate set to be added into A(t). In step A18, for each member in the cluster, it is determined whether its SINR requirement is met, that is, determining whether the SINR is higher than its threshold. If the SINR is higher than its threshold, it is indicated that the secondary system added in step A17 can be added into the cluster, and the processing returns to step A14 to continue the operation of adding a cluster member. Otherwise, if there is a secondary system in the cluster of which the SINR is lower than its threshold, it is indicated that the secondary system added in step A17 cannot be added into the cluster, the processing proceeds to step A19, and the newly added secondary system is removed from the cluster and the secondary system is removed from the candidate set. Subsequently, in step A20, it is determined whether the candidate set is empty. If the candidate set is empty, the processing returns to step A17, and it is attempted to add another secondary system in the candidate set. Otherwise, it means that a new cluster is required to be created, and thus in step A21, 1 is added to the number t of the cluster. Further, in step A22, it is determined whether the number of clusters exceeds the number of available channels. If it is determined in step A22 that the number of clusters exceeds the number of available channels, it is indicated that a new cluster cannot be created, the processing proceeds to step A23, the clustering ends and a clustering result for the first set is output. Otherwise, if it is determined in step A22 that the number of clusters does not exceed the number of available channels, the processing returns to step A13 and clustering continues.

Figure 6:
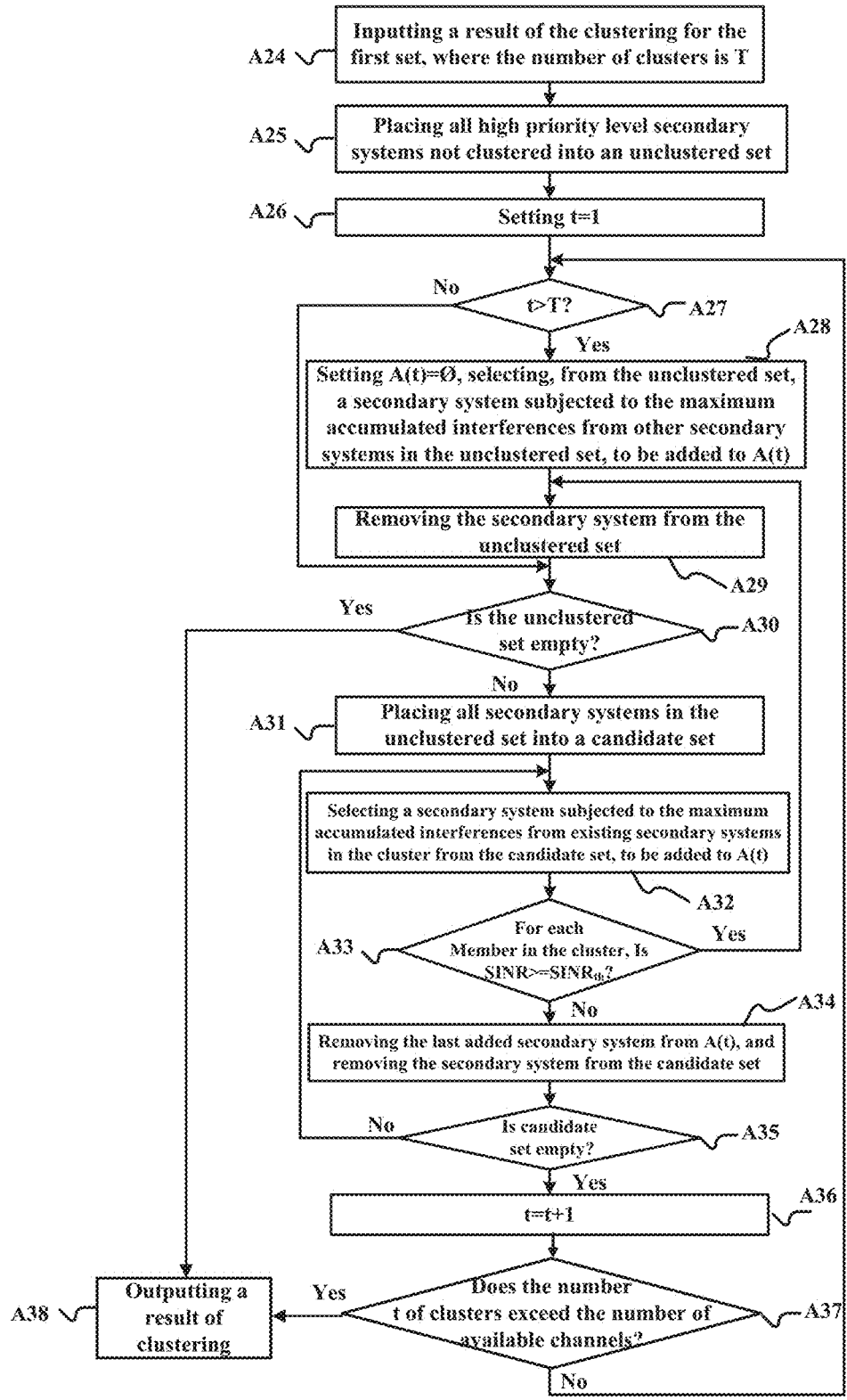
FIG. 6 shows a specific example of a flowchart of clustering high priority level secondary systems in a second set.

FIG. 6 shows a specific example of a flowchart of a clustering operation for the second set in the example. Numbers of steps in FIG. 6 follow those in FIG. 5. In step A24, the clustering result for the first set is input, and it is assumed that the number of existing clusters is T at this time. In step A25, all high priority level secondary systems not clustered are added into the unclustered set. In step A26, an initial value of the number t of the cluster is set to 1. In step A27, it is determined whether the number t is greater than T. If the number t is not greater than T, it is indicated that the current cluster is a cluster created for the first set during clustering, subsequently a new member is to be added into the cluster, and the processing proceeds to step A30. Otherwise, if the number t is greater than T, it is indicated that a new cluster is to be created, and the processing proceeds to step A28. In step A28, the cluster A(t) is initialized into an empty set, and a secondary system among the unclustered set which is subjected to the maximum accumulated interferences from other secondary systems in the unclustered set is selected to be added into the cluster A(t). Subsequently, in step A29, the secondary system added into the cluster is removed from the unclustered set.

In step A30, it is determined whether the unclustered set is empty. If the unclustered set is empty, it is indicated that the clustering ends, the processing proceeds to step A38, and a final clustering result is output. Otherwise, the processing proceeds to step A31, and all high priority level secondary systems in the unclustered set are added into the candidate set. Subsequently, in step A32, a secondary system which is subjected to the maximum accumulated interferences from the existing secondary systems in the cluster is selected from the candidate set to be added into A(t). In step A33, for each member in the cluster, it is determined whether its SINR requirement is met, for example, determining whether the SINR is higher than its threshold. If the SINR is higher than the threshold, it is indicated that the secondary system added in step A32 can be added into the cluster, the processing returns to step A27, to continue an operation of adding a cluster member. Otherwise, the processing proceeds to step A34, a newly added secondary system is removed from the cluster and the secondary system is removed from the candidate set. Subsequently, in step A35, it is determined whether the candidate set is empty. If the candidate set is not empty, the processing returns to step A32, and it is attempted to add another secondary system in the candidate set. Otherwise, it means that a new cluster is to be created, in step A36, 1 is added to the number t of the cluster, and in step A37, it is determined whether the number of clusters exceeds the number of available channels. If it is determined in step A37 that the number of clusters exceeds the number of available channels, it is indicated that the new cluster cannot be created, the processing proceeds to step A38, the clustering ends and a clustering result is output. Otherwise, if it is determined in step A37 that the number of clusters does not exceed the number of available channels, the processing returns to step A27, and the clustering continues.

Alternatively, the clustering unit 102 may be configured to first cluster high priority level secondary systems in the second set, and then cluster high priority level secondary systems in the first set based on a result of the clustering. For the specific clustering method, one may refer to the above method, which is not described herein.

In another example, the clustering unit 102 may set different weights for high priority level secondary systems in the first set and in the second set respectively; and cluster the high priority level secondary systems in the first set and the second set simultaneously, where the accumulated interferences to which the high priority level secondary system is subjected is weighted by using a corresponding weight. In this example, the high priority level secondary systems in the first set and those in the second set are distinguished by weights. The clustering method does not change, and only the accumulated interferences which the high priority level secondary system is subjected to is weighted based on a category of the high priority level secondary system.

Specifically, for example, a directed weighted graph may be established including all high priority level secondary systems in the first set and the second set. However, after the accumulated interferences (for example, the accumulated interferences subjected from high priority level secondary systems not clustered or the accumulated interferences subjected from the existing secondary systems in the cluster) to which a certain high priority level secondary system is subjected are calculated based on the directed weighted graph, the accumulated interferences are weighted by using a corresponding weight. For example, a weight $\beta_1$ is set for the high priority level secondary systems in the first set and a weight $\beta_2$ is set for the high priority level secondary systems in the second set.

Exemplarily, the weight for the high priority level secondary system in the first set may be set to be greater than the weight for the high priority level secondary system in the second set, that is, $\beta_1 > \beta_2$. In this way, the high priority level secondary systems in the first set can be clustered preferentially, for example.

With the electronic apparatus 100 according to the embodiment of the present disclosure, the high priority level secondary systems are classified based on interferences between the low priority level secondary systems and the high priority level secondary systems, and clustering and spectrum resource allocation are performed based on a result of the classifying, thereby effectively increasing the available spectrum for the low priority level secondary systems while ensuring quality of service of the high priority level secondary systems.

It should be understood that, the clustering method used by the clustering unit 102 in the embodiment is not limited to those described above, and any suitable method may be adopted.

Second Embodiment

Figure 7:
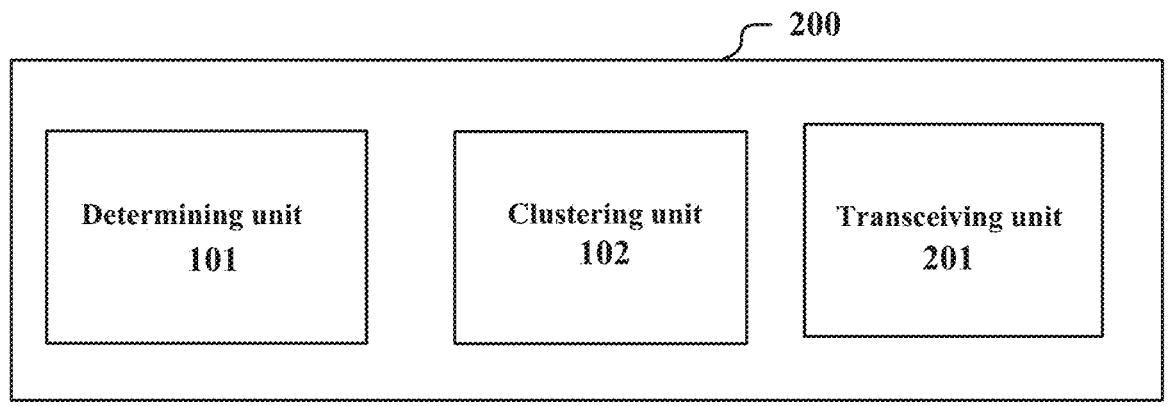
FIG. 7 shows a block diagram of functional modules of an electronic apparatus according to another embodiment of the present disclosure.

FIG. 7 shows a block diagram of functional modules of an electronic apparatus 200 according to an embodiment of the present disclosure. As shown in FIG. 7, in addition to the determining unit 101 and the clustering unit 102 described with reference to FIG. 2, the electronic apparatus 200 further includes: a transceiving unit 201, configured to receive information regarding at least one of the following to be used in operations of the determining unit 101 and the clustering unit 102: a priority level, a geographical location, an emitting power and quality of service requirement of the secondary system. For example, the determining unit 101 may determine high priority level secondary systems and low priority level secondary systems based on the above information, and further determine mutual interferences between the high priority level secondary systems and the low priority level secondary systems, thereby determining the first set based on the mutual interferences. The clustering unit 102 performs clustering based on the above information related to the high priority level secondary systems in the first set. As described above, the clustering unit 102 may establish a directed weighted graph based on the information, and thus determine an interference relationship between the high priority level secondary systems, thereby performing clustering based on the interference relationship. In addition, as for the second set, the determining unit 101 and the clustering unit 102 perform similar operations, and specific details are described in the first embodiment, which are not repeated here.

In an example, the secondary systems are managed by a single spectrum coordinator. The electronic apparatus 200, for example, is located in the spectrum coordinator or is connected to the spectrum coordinator. In this case, the transceiving unit 201 receives the above information from the low priority secondary systems and the high priority level secondary systems.

In the first embodiment, operations of the determining unit 101 and the clustering unit 102 relate to only secondary systems managed by the same spectrum coordinator. The transceiving unit 201 is further configured to notify high priority level secondary systems of spectrum allocated to respective high priority level secondary systems by the spectrum coordinator based on a result of the clustering.

Figure 8:
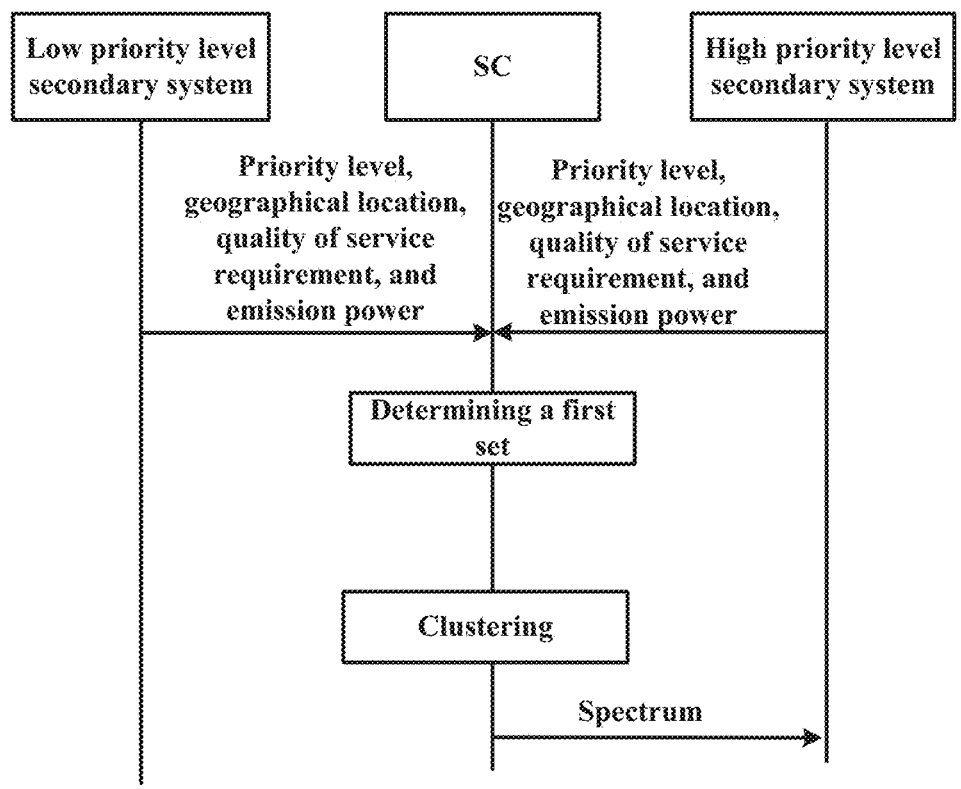
FIG. 8 shows an example of the information procedure.

For ease of understanding, FIG. 8 shows an example of information procedure for information interaction between the spectrum coordinator and the secondary systems. It should be understood that, the information procedure is only illustrative rather than restrictive. The spectrum coordinator may include any one of the electronic apparatus 100 and 200 described above or implement at least a part of functions thereof.

Firstly, secondary systems managed by the spectrum coordinator (SC) report information such as a priority level, a geographical location, an emission power, and quality of service requirement for example a SINR threshold of respective secondary systems, to the SC. The SC determines the first set based on the information, that is, a set of high priority level secondary systems for which the mutual interferences between its high priority level secondary system and at least one low priority level secondary system exceed a predetermined level. Then, the SC clusters the high priority level secondary systems based on the first set, and allocates spectrum based on a result of the clustering. The SC notifies respective high priority level secondary systems of the allocated spectrum.

In another example, the secondary systems are managed by multiple spectrum coordinators. The electronic apparatus 200, for example, is located in a public spectrum coordinator controlling multiple spectrum coordinators, or is connected to the public spectrum coordinator. In the example, the public spectrum coordinator collectively clusters secondary systems in an overlapping area, and it is unnecessary to exchange sensitive user information between spectrum coordinators, thereby being beneficial to protect privacy and improving security.

In the scenario shown in FIG. 1, a public spectrum coordinator may be provided to control operations of SC1 and SC2. The public spectrum coordinator may determine the overlapping area based on geographical location information, and then notifies the spectrum coordinators of the determined overlapping area. Alternatively, respective managing areas can be exchanged between respective spectrum coordinators, thereby determining the overlapping area. The latter way may be implemented by broadcasting for example.

In the example, the transceiving unit 201 is configured to receive, from each spectrum coordinator, the above relevant information of secondary systems managed by the spectrum coordinator. The determining unit 101 determines an interference set of each low priority level secondary system based on the information, such as the determined interference sets of SS1 and SS2, and combines the interference sets to obtain the first set. Then, the clustering unit 102 clusters the high priority level secondary systems in the first set.

In addition, the transceiving unit 201 is further configured to transmit the result of clustering to a corresponding spectrum coordinator, so that the spectrum coordinator allocates spectrum resources to high priority level secondary systems managed by the spectrum coordinator based on the result of the clustering. Exemplarily, the result of clustering may include an identifier of a high priority level secondary system managed by the spectrum coordinator and a cluster identifier of a cluster the high priority level secondary system belongs to. For example, there may be a one-to-one correspondence between the cluster identifiers and the spectrum resources, so that the spectrum coordinator may determine spectrum resources to be allocated to the high priority level secondary systems belonging to the cluster based on the cluster identifier.

Figure 9:
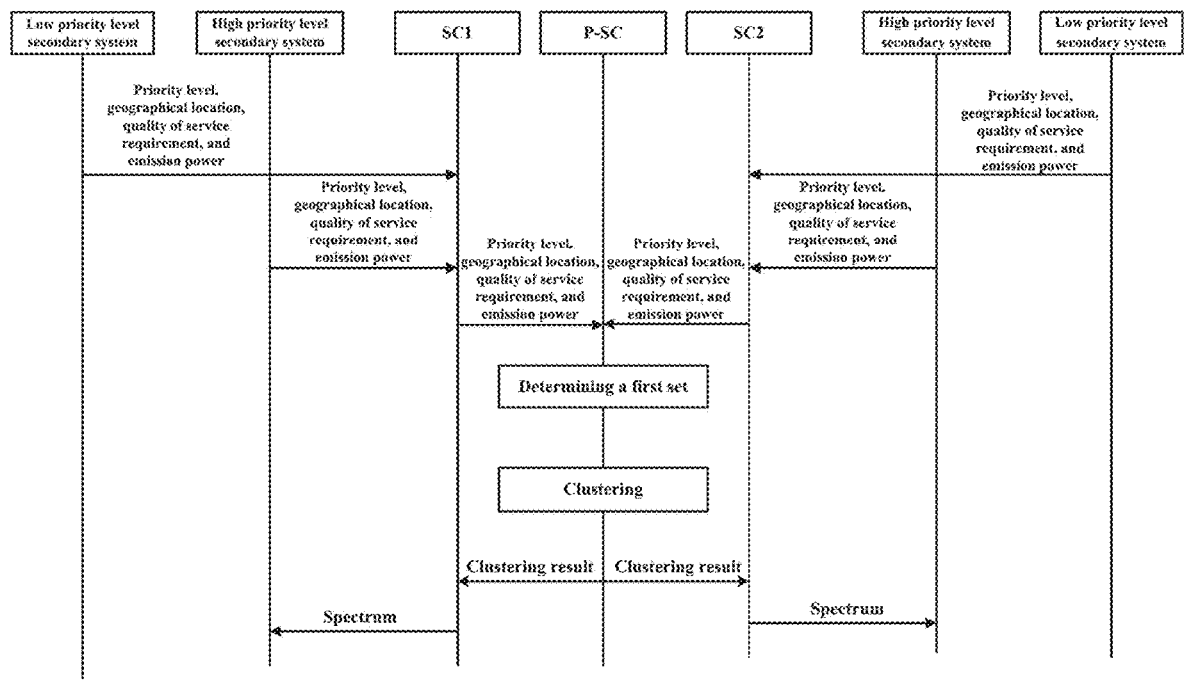
FIG. 9 shows another example of the information procedure.

For ease of understanding, FIG. 9 shows an example of information procedure for information interaction in the example. It should be understood that, the information procedure is only illustrative rather than restrictive. The public spectrum coordinator may include any one of the electronic apparatus 100 and 200 described above or implement at least a part of functions of the electronic apparatus 100 and 200.

Firstly, secondary systems managed by the spectrum coordinator (SC1), including high priority level secondary systems and low priority level secondary systems, report information such as a priority level, a geographical location, an emission power, and quality of service requirement for example an SINR threshold of respective secondary systems to the SC1. Secondary systems managed by the SC2 also report the information to the SC2. Then, the SC1 and the SC2 report the information to P-SC. The P-SC determines the first set based on the information, that is, a set of high priority level secondary systems for which the mutual interferences between its high priority level secondary system and at least one low priority level secondary system exceed a predetermined level. Then, the SC clusters the high priority level secondary systems managed by the SC1 and SC2 based on the first set, and provides a result of clustering, for example an identifier of the high priority level secondary system and a cluster identifier of a cluster the high priority level secondary system belongs to, to a corresponding spectrum coordinator. The spectrum coordinator allocates spectrum for high priority level secondary systems managed by the spectrum coordinator based on the result of the clustering, and notifies the respective high priority level secondary systems of the allocated spectrum.

Although the case that the electronic apparatus 200 is located in the public spectrum coordinator or is connected to the public spectrum coordinator is described above, the electronic apparatus 200 may be located in a spectrum coordinator in a case that there is no public spectrum coordinator. Specifically, the transceiving unit 201 receives the above related information (information such as a priority level, a geographical location, an emission power and quality of service requirement of each secondary system managed by the spectrum coordinator) from other spectrum coordinators. The determining unit 101 and the clustering unit 102 perform the determining and clustering operations. After the clustering ends, the transceiving unit 201 transmits the result of the clustering to respective spectrum coordinators. Related details are described in detail above, which are not repeated here.

Figure 10:
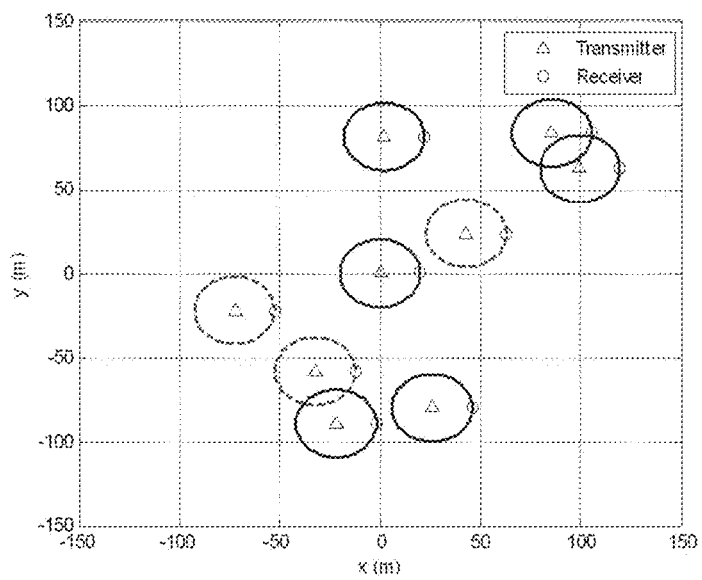
FIG. 10 shows a schematic diagram of a simulation scenario.

Improvement of system performance produced by the clustering technology of the present disclosure is shown by a simulation example in the following. FIG. 10 shows a schematic diagram of a simulating scenario. The high priority level secondary systems and the low priority level secondary systems share the same spectrum pool. It is assumed that in a given time interval, only one pair of users are in communication in each secondary system. A transmitter is located at a center of the secondary system, and a receiver is located at an edge of the secondary system. Transmitters of the high priority level secondary systems are distributed in an area of 100 meters multiplied by 100 meters randomly, and a transmitter of the low priority level secondary system is located at a center of the whole area. A service radius of each secondary system is 20 meters, and only large-scale fading is considered.

Simulation parameters are set as follows. The number of high priority level secondary systems is 8 or 15, the number of low priority level secondary systems is 1, the number of available channels is 5, an SINR threshold is 15 dB, an emission power is 0 dBm, and a path loss index is 3.

Figure 11:
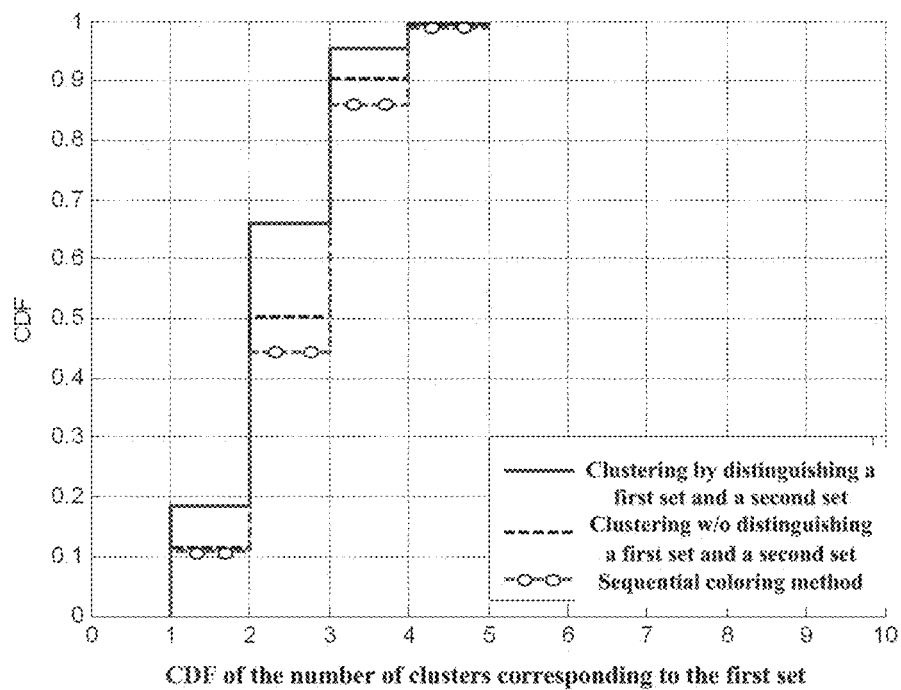
FIG. 11 shows a graph of a simulation result.

In the simulation, the number of the high priority level secondary systems is set to 8, the locations of the 8 secondary systems are changed, and 1000 times of cyclic simulations are performed. FIG. 11 shows the cumulative distribution of the number of clusters obtained by clustering the high priority level secondary systems in the first set (shown by a solid line), in a case that the first set is determined. In addition, FIG. 11 also shows the cumulative distribution of the number of clusters for the first set obtained by clustering the high priority level secondary systems using the clustering method according to the present disclosure without distinguishing the first set and the second set (shown by a dotted line), and the cumulative distribution of the number of clusters for the first set obtained by clustering the high priority level secondary systems using a sequential coloring algorithm (shown by dotted line with circles).

It may be seen that, compared with the method of not distinguishing the first set and the second set and the conventional sequential coloring algorithm, with the clustering method which distinguishes the first set and the second set according to the present disclosure, the number of clusters of the high priority level secondary systems in the first set can be decreased, that is, increasing available spectrum for the low priority level secondary systems.

Figure 12:
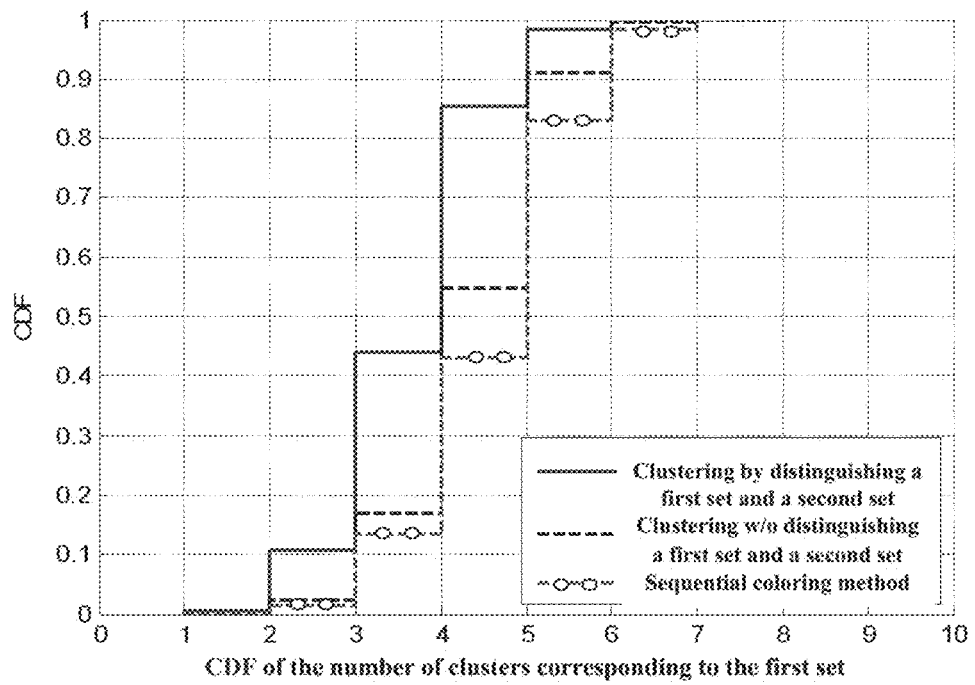
FIG. 12 shows another graph of the simulation result.

Similarly, FIG. 12 shows a simulation result corresponding to FIG. 11 in a case that the number of the high priority level secondary systems is 15, and 1000 times of cyclic simulations are performed. It may be seen that, compared with the sequential coloring algorithm, as the number of the high priority level secondary systems increases, the advantage of decreasing the number of clusters of the high priority level secondary systems in the first set with the algorithm according to the present disclosure is more significant.

In addition, it may be seen that, in a case that 8 high priority level secondary systems are distributed randomly in a certain area, the number of clusters for the first set obtained with the algorithm according to the present disclosure ranges from 2 to 5. In a case that 15 high priority level secondary systems are distributed randomly in a certain area, the number of clusters for the first set obtained with the algorithm of the present disclosure ranges from 2 to 7.

Third Embodiment

In the process of describing the electronic apparatus in the embodiments described above, obviously, some processing and methods are also disclosed. Hereinafter, an overview of the methods is given without repeating some details disclosed above. However, it should be noted that, although the methods are disclosed in a process of describing the electronic apparatus, the methods do not certainly employ or are not certainly executed by the aforementioned components. For example, the embodiments of the electronic apparatus may be partially or completely implemented with hardware and/or firmware, the method described below may be executed by a computer-executable program completely, although the hardware and/or firmware of the apparatus can also be used in the methods.

Figure 13:
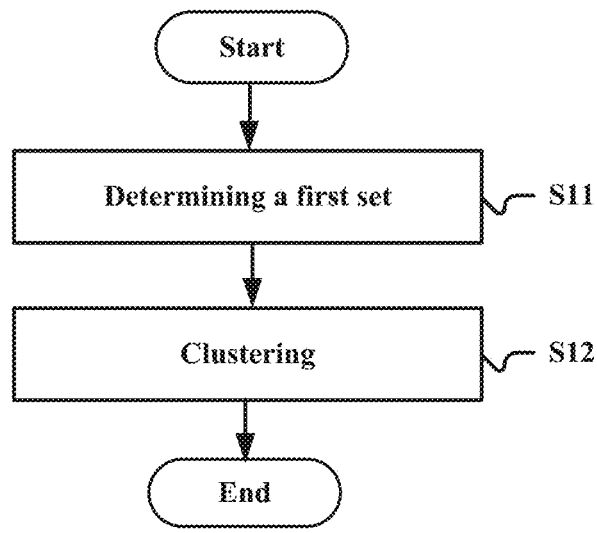
FIG. 13 shows a flowchart of a method for an electronic apparatus according to an embodiment of the present disclosure.

FIG. 13 shows a flowchart of a method for an electronic apparatus according to an embodiment of the present disclosure. The method includes: obtaining, based on mutual interferences between low priority level secondary systems and high priority level secondary systems, a first set of the high priority level secondary systems (S11), where mutual interferences between the high priority level secondary systems in the first set and at least one low priority level secondary system are higher than a predetermined level; and clustering, based on the information related to the first set, the high priority level secondary systems in the first set (S12).

In step S11, for example, a first set is determined by determining an interference set of each low priority level secondary system and combining the interference sets. The interference set includes a high priority level secondary system which generates interferences higher than a first predetermined level to the low priority level secondary system and a high priority level secondary system which is subjected to interferences higher than a second predetermined level from the low priority level secondary system. For example, a predetermined level of interferences is indicated by a predetermined signal to interference and noise ratio.

For example, for a mobile secondary system, its interference radius may be determined, and thus its interference area is determined based on its moving area, thereby determining the interference set. The moving area may be determined with reference to historical information or a geographical location database.

In an example, in step S12, clustering is performed to minimize the number of clusters into which the high priority level secondary systems in the first set are clustered.

In another example, in step S11, high priority level secondary systems outside of the first set are taken as a second set. Mutual interferences between high priority level secondary systems in the second set and each low priority level secondary system are lower than the predetermined level. In step S12, based on information related to the first set and the second set, the high priority level secondary systems are clustered. For example, the clustering is performed to minimize the number of finally obtained clusters.

For example, the high priority level secondary systems in the first set may be clustered firstly, and then the high priority level secondary systems in the second set are clustered based on a result of the clustering. Alternatively, the high priority level secondary systems in the second set may be clustered firstly, and then the high priority level secondary systems in the first set are clustered based on a result of the clustering.

Alternatively, different weights may be set for the high priority level secondary systems in the first set and in the second set respectively, and the high priority level secondary systems in the first set and in the second set are clustered simultaneously. The accumulated interferences the high priority level secondary system is subjected to are weighted by using a respective weight during the clustering. For example, a weight for the high priority level secondary system in the first set may be set to be greater than a weight for the high priority level secondary system in the second set.

As an example, the high priority level secondary systems in the first set may be clustered as follows: selecting a high priority level secondary system which is subjected to the maximum accumulated interferences from other high priority level secondary systems that are not clustered in the first set, as a first member of a cluster; selecting, when adding a new member, a high priority level secondary system which is subjected to maximum accumulated interferences from existing members in the cluster, from the high priority level secondary systems that are not clustered in the first set, so that the mutual interferences among respective members in the cluster after adding do not exceed an allowable value. A new cluster is created if there is a high priority level secondary system which cannot be added into the existing clusters, in a case that the number of the existing clusters does not reach the number of available channels.

In addition, the high priority level secondary system in the second set is added into the existing clusters obtained by clustering the high priority level secondary systems in the first set when clustering the high priority level secondary systems in the second set, and a new cluster is created in a case that the high priority level secondary system cannot be added into the existing cluster and the number of the existing clusters does not reach the number of available channels.

An interference relationship between the high priority level secondary systems may be determined by establishing a directed weighted graph.

In addition, the high priority level secondary systems in the first set and in the second set can be clustered independently.

In a case that the secondary systems are managed by a single spectrum coordinator, the method may be performed by the spectrum coordinator. Although not shown in the figure, the above method may further include: receiving, from the low priority level secondary systems and the high priority level secondary systems, information regarding at least one of the following to be used for processing of steps S11 and S12: a priority level, a geographical location, an emission power and quality of service requirement of a secondary system; and notifying high priority level secondary systems of spectrum allocated to the respective high priority level secondary systems by the spectrum coordinator based on a result of the clustering.

In a case that the secondary systems are managed by multiple spectrum coordinators respectively, the method may be performed by a public spectrum coordinator or one spectrum coordinator. Although not shown in the figure, the method may further include: receiving, from each spectrum coordinator, information regarding at least one of the following of the secondary systems managed by the spectrum coordinator to be used for processing of steps S11 and S12: a priority level, a geographical location, an emission power and quality of service requirement of the secondary system; and transmitting a result of the clustering to respective spectrum coordinators. For example, the result of clustering may include an identifier of the high priority level secondary system managed by the respective spectrum coordinator and a cluster identifier of the cluster the high priority level secondary system belongs to.

Note that each of the above methods may be used in combination or separately and the details thereof have been described in detail in the first to second embodiments, which will be not repeated herein.

In summary, with the electronic apparatus and the method according to the present disclosure, one or more of the following effects can be achieved: increasing available spectrums for the low priority level secondary systems; ensuring quality of service of the high priority level secondary system; avoiding exchanging sensitive information of the secondary systems between the spectrum coordinators; protecting privacy and improving security.

Application Example

The technology according to the present disclosure may be applied to various types of products. For example, the electronic apparatus 100 to 200 may be implemented as any type of servers, such as a tower server, a rack server or a blade server. The electronic apparatus 100 to 200 may be control modules installed in the server (such as an integrated circuit module including a single wafer, and a card or blade inserted into a slot of the blade server).

For example, a base station in the above mentioned secondary system may be realized as any type of evolved Node B (eNB) such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments, which will be described below, may each operate as the base station by temporarily or semi-persistently executing a base station function.

For example, user equipment in the secondary systems may be implemented as a mobile terminal (such as a smart phone, a tablet personal computer (PC), a notebook PC, a portable game terminal and a portable/dongle mobile router and a digital camera) or an in-vehicle terminal such as a car navigation apparatus. The UE may be further implemented as a terminal performing machine to machine (M2M) communication (that is also referred to as a machine type communication (MTC) terminal). In addition, the user equipment may be a wireless communication module installed on each of the above terminals (such as an integrated circuit module including a single wafer).

Application Examples Regarding the Electronic Apparatus

Figure 14:
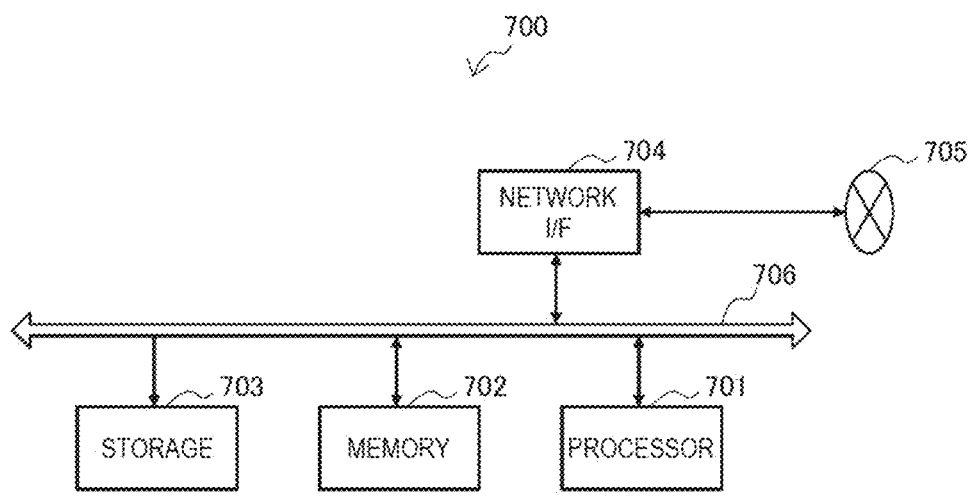
FIG. 14 shows a block diagram illustrating an example of a schematic configuration of a server.

FIG. 14 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 shown in FIG. 14, the determining unit 101 and the clustering unit 102 and so on described with reference to FIG. 2 and FIG. 7 may be implemented by the processor 701. For example, the processor 701 may perform the determining operation and the clustering operation for the first set according to the present disclosure by performing operations of the determining unit 101 and the clustering unit 102.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1500 shown in FIG. 15) from a storage medium or network, wherein the computer is capable of implementing various functions when installed with various programs.

Figure 15:
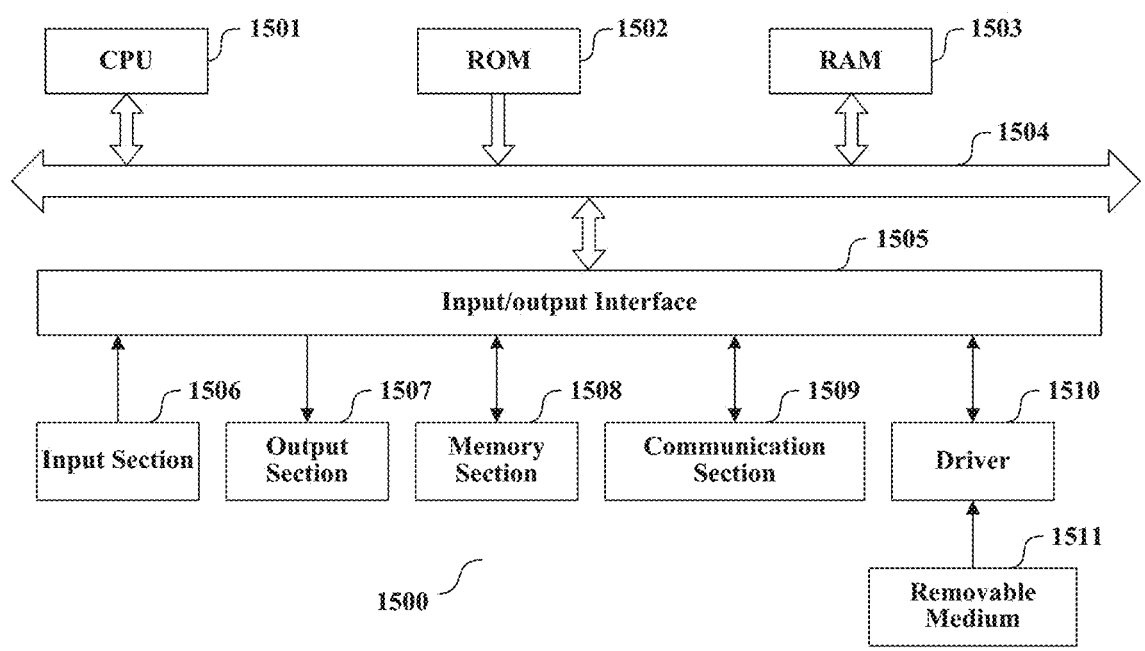
FIG. 15 is a block diagram of an exemplary block diagram illustrating the structure of a general purpose personal computer capable of realizing the method and/or device and/or system according to the embodiments of the present invention.

In FIG. 15, a central processing unit (CPU) 1501 executes various processing according to a program stored in a read-only memory (ROM) 1502 or a program loaded to a random access memory (RAM) 1503 from a memory section 1508. The data needed for the various processing of the CPU 1501 may be stored in the RAM 1503 as needed. The CPU 1501, the ROM 1502 and the RAM 1503 are linked with each other via a bus 1504. An input/output interface 1505 is also linked to the bus 1504.

The following components are linked to the input/output interface 1505: an input section 1506 (including keyboard, mouse and the like), an output section 1507 (including displays such as a cathode ray tube (CRT), a liquid crystal display (LCD), a loudspeaker and the like), a memory section 1508 (including hard disc and the like), and a communication section 1509 (including a network interface card such as a LAN card, modem and the like). The communication section 1509 performs communication processing via a network such as the Internet. A driver 1510 may also be linked to the input/output interface 1505, if needed. If needed, a removable medium 1511, for example, a magnetic disc, an optical disc, a magnetic optical disc, a semiconductor memory and the like, may be installed in the driver 1510, so that the computer program read therefrom is installed in the memory section 1508 as appropriate.

In the case where the foregoing series of processing is achieved through software, programs forming the software are installed from a network such as the Internet or a memory medium such as the removable medium 1511.

It should be appreciated by those skilled in the art that the memory medium is not limited to the removable medium 1511 shown in FIG. 15, which has program stored therein and is distributed separately from the apparatus so as to provide the programs to users. The removable medium 1511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1502 and the memory section 1508 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus, comprising:
processing circuitry, configured to:
determine, based on mutual interferences between low priority level secondary systems and high priority level secondary systems, a first set of the high priority level secondary systems, wherein the mutual interferences between the high priority level secondary systems in the first set and at least one low priority level secondary system are higher than a predetermined level;

cluster, based on information related to the first set, the high priority level secondary systems in the first set;

perform the clustering to minimize a number of clusters into which the high priority level secondary systems in the first set are clustered;

take the high priority level secondary systems outside of the first set as a second set, wherein the mutual interferences between the high priority level secondary systems in the second set and each of the low priority level secondary systems are lower than the predetermined level; and cluster, based on information related to the first set and the second set, the high priority level secondary systems.

2. The electronic apparatus according to claim 1, wherein the processing circuitry is configured to perform the clustering to minimize a number of finally obtained clusters.

3. The electronic apparatus according to claim 1, wherein the processing circuitry is configured to first cluster the high priority level secondary systems in the first set, and then cluster, based on a result of the clustering, the high priority level secondary systems in the second set.

4. The electronic apparatus according to claim 1, wherein the processing circuitry is configured to first cluster the high priority level secondary systems in the second set, and then cluster, based on a result of the clustering, the high priority level secondary systems in the first set.

5. The electronic apparatus according to claim 1, wherein the processing circuitry is configured to:

set different weights for the high priority level secondary systems in the first set and the high priority level secondary systems in the second set, respectively; and cluster the high priority level secondary systems in the first set and in the second set simultaneously, wherein accumulated interferences which a high priority level secondary system is subjected to are weighted using the corresponding weight during clustering.

6. The electronic apparatus according to claim 5, wherein the processing circuitry is configured to set a higher weight for the high priority level secondary systems in the first set than the high priority level secondary systems in the second set.

7. The electronic apparatus according to claim 3, wherein the processing circuitry is configured to:

select a high priority level secondary system which is subjected to maximum accumulated interferences from other high priority level secondary systems that are not clustered in the first set, as a first member of a cluster; and select, when adding a new member, a high priority level secondary system which is subjected to maximum accumulated interferences from existing members in the cluster, from the high priority level secondary systems that are not clustered in the first set, so that the mutual interferences among respective members in the cluster after adding do not exceed an allowable value.

8. The electronic apparatus according to claim 7, wherein the processing circuitry is further configured to create a new cluster if there is a high priority level secondary system which cannot be added to existing clusters, in a case that the number of the existing clusters does not reach the number of available channels.

9. The electronic apparatus according to claim 7, wherein the processing circuitry is configured to add the high priority level secondary systems in the second set to existing clusters which are obtained by clustering the high priority level secondary systems in the first set when clustering the high priority level secondary systems in the second set, and create a new cluster in a case that the high priority level secondary systems cannot be added to the existing clusters and the number of the existing clusters does not reach the number of available channels.

10. The electronic apparatus according to claim 7, wherein the processing circuitry is configured to determine interference relationships between the high priority level secondary systems by establishing a directed weighted graph.

11. The electronic apparatus according to claim 1, wherein the processing circuitry is configured to determine the first set by determining an interference set of each low priority level secondary system and combining the interference sets, and wherein the interference set comprises a high priority level secondary system which generates interferences higher than a first predetermined level to the low priority level secondary system and a high priority level secondary system which is subjected to interferences higher than a second predetermined level from the low priority level secondary system.

12. The electronic apparatus according to claim 11, wherein the processing circuitry is configured to determine an interference radius for a mobile secondary system, so as to determine its interference area based on its moving area, thereby determining the interference set.

13. The electronic apparatus according to claim 12, wherein the processing circuitry is configured to determine the moving area with reference to history information or a geographical location database.

14. The electronic apparatus according to claim 1, wherein the predetermined level of the interferences are represented by a predetermined signal to interference and noise ratio.

15. The electronic apparatus according to claim 1, wherein all the secondary systems are managed by a single spectrum coordinator, and the processing circuitry is further configured to receive, from the low priority level secondary systems and the high priority level secondary systems, information regarding at least one of the following to be used in processing of the processing circuitry: a priority level, a geographical location, an emitting power and quality of service requirement of the secondary system.

16. The electronic apparatus according to claim 1, wherein the processing circuitry is further configured to notify the high priority level secondary systems of spectrum allocated to the respective high priority level secondary systems by the spectrum coordinator based on a result of the clustering of the processing circuitry.

17. The electronic apparatus according to claim 1, wherein the secondary systems are managed by a plurality of spectrum coordinators respectively, and the processing circuitry is further configured to:

receive, from each spectrum coordinator, information regarding at least one of the following of the secondary systems managed by the spectrum coordinator to be used in processing of the processing circuitry: a priority level, a geographical location, an emitting power and quality of service requirement of the secondary system; and transmit a result of clustering of the processing circuitry to the respective spectrum coordinators.

18. The electronic apparatus according to claim 17, wherein the result of clustering comprises an identifier of the high priority level secondary system managed by the corresponding spectrum coordinator and a cluster identifier of the cluster which the high priority level secondary system belongs to.

19. A method performed using processing circuitry of an electronic apparatus, comprising:
- determining, based on mutual interferences between low priority level secondary systems and high priority level secondary systems, a first set of the high priority level secondary systems, wherein the mutual interferences between the high priority level secondary systems in the first set and at least one low priority level secondary system are higher than a predetermined level;
- clustering, based on information related to the first set, the high priority level secondary systems in the first set;
- performing the clustering to minimize a number of clusters into which the high priority level secondary systems in the first set are clustered;
- taking the high priority level secondary systems outside of the first set as a second set, wherein the mutual interferences between the high priority level secondary systems in the second set and each of the low priority level secondary systems are lower than the predetermined level; and
- clustering, based on information related to the first set and the second set, the high priority level secondary systems.

20. A non-transitory, computer-readable medium storing instruction that, when executed by processing circuitry of an electronic apparatus, control the processing circuitry to implement a method comprising:
- determining, based on mutual interferences between low priority level secondary systems and high priority level secondary systems, a first set of the high priority level secondary systems, wherein the mutual interferences between the high priority level secondary systems in the first set and at least one low priority level secondary system are higher than a predetermined level;
- clustering, based on information related to the first set, the high priority level secondary systems in the first set;
- performing the clustering to minimize a number of clusters into which the high priority level secondary systems in the first set are clustered;
- taking the high priority level secondary systems outside of the first set as a second set, wherein the mutual interferences between the high priority level secondary systems in the second set and each of the low priority level secondary systems are lower than the predetermined level; and
- clustering, based on information related to the first set and the second set, the high priority level secondary systems.

* * * * *